US006644526B2

United States Patent
Pegorier

(10) Patent No.: US 6,644,526 B2
(45) Date of Patent: Nov. 11, 2003

(54) MOTOR VEHICLE CENTRAL CONSOLE

(75) Inventor: Nicolas Pegorier, Meru (FR)

(73) Assignee: Sai Automotive Allibert Industrie, Nanterre (FR)

(*) Notice: Subject to any disclaimer, the term of this patent is extended or adjusted under 35 U.S.C. 154(b) by 174 days.

(21) Appl. No.: 09/986,061

(22) Filed: Nov. 7, 2001

(65) Prior Publication Data

US 2002/0057002 A1 May 16, 2002

(30) Foreign Application Priority Data

Nov. 14, 2000 (FR) .............................. 00 14602

(51) Int. Cl.$^7$ ................................ B60R 7/00
(52) U.S. Cl. ................ 224/539; 296/37.8; 220/212; 220/826; 220/840
(58) Field of Search ................ 224/275, 486, 224/539; 296/37.8; 220/212, 817, 818, 819, 826, 840

(56) References Cited

U.S. PATENT DOCUMENTS

| 3,979,007 | A | * | 9/1976 | Thornbloom, Jr. ........ 220/522 |
| 4,889,257 | A | * | 12/1989 | Steffes ........................ 220/815 |
| 5,067,625 | A | * | 11/1991 | Numata ...................... 220/827 |
| 5,076,641 | A | | 12/1991 | Lindberg |
| 5,144,720 | A | * | 9/1992 | Aihara et al. ................ 16/232 |
| 5,173,992 | A | * | 12/1992 | Aihara et al. ................ 16/232 |
| 5,195,272 | A | * | 3/1993 | Yamada ........................ 49/193 |
| 5,210,906 | A | * | 5/1993 | Aihara et al. ................ 16/232 |
| 5,212,849 | A | * | 5/1993 | Aihara ........................ 16/232 |
| 5,562,331 | A | | 10/1996 | Spykerman et al. |
| 5,647,652 | A | * | 7/1997 | Zalewski et al. ........... 312/324 |
| 6,003,716 | A | | 12/1999 | Allison et al. |
| 6,142,333 | A | * | 11/2000 | Sasamoto et al. .......... 220/264 |
| 6,250,729 | B1 | * | 6/2001 | Allison et al. .............. 312/324 |

FOREIGN PATENT DOCUMENTS

| DE | G 92 12 168.3 A | 11/1992 |
| JP | 03276832 A | 12/1991 |
| JP | 07266966 A | 10/1995 |
| JP | 08048189 A | 2/1996 |
| JP | 08142760 A | 6/1996 |

* cited by examiner

Primary Examiner—Stephen K. Cronin
(74) Attorney, Agent, or Firm—Rothwell, Figg, Ernst & Manbeck

(57) ABSTRACT

A motor vehicle central console comprising an enclosure having a base and four lateral faces arising from the base forming an opening opposite to said base, and at least one lid comprising a recto face and a verso face, having means for coupling to the enclosure co-operating with complementary coupling means borne by the enclosure, and at least partially closing said opening. The lid is completely removable. Said coupling means of the lid are completely and simply disconnectable from said complementary coupling means of the enclosure. In the mounted position, the coupling means of the lid co-operate with the complementary coupling means of the enclosure, regardless of which face of the lid is facing the base of the enclosure.

9 Claims, 5 Drawing Sheets

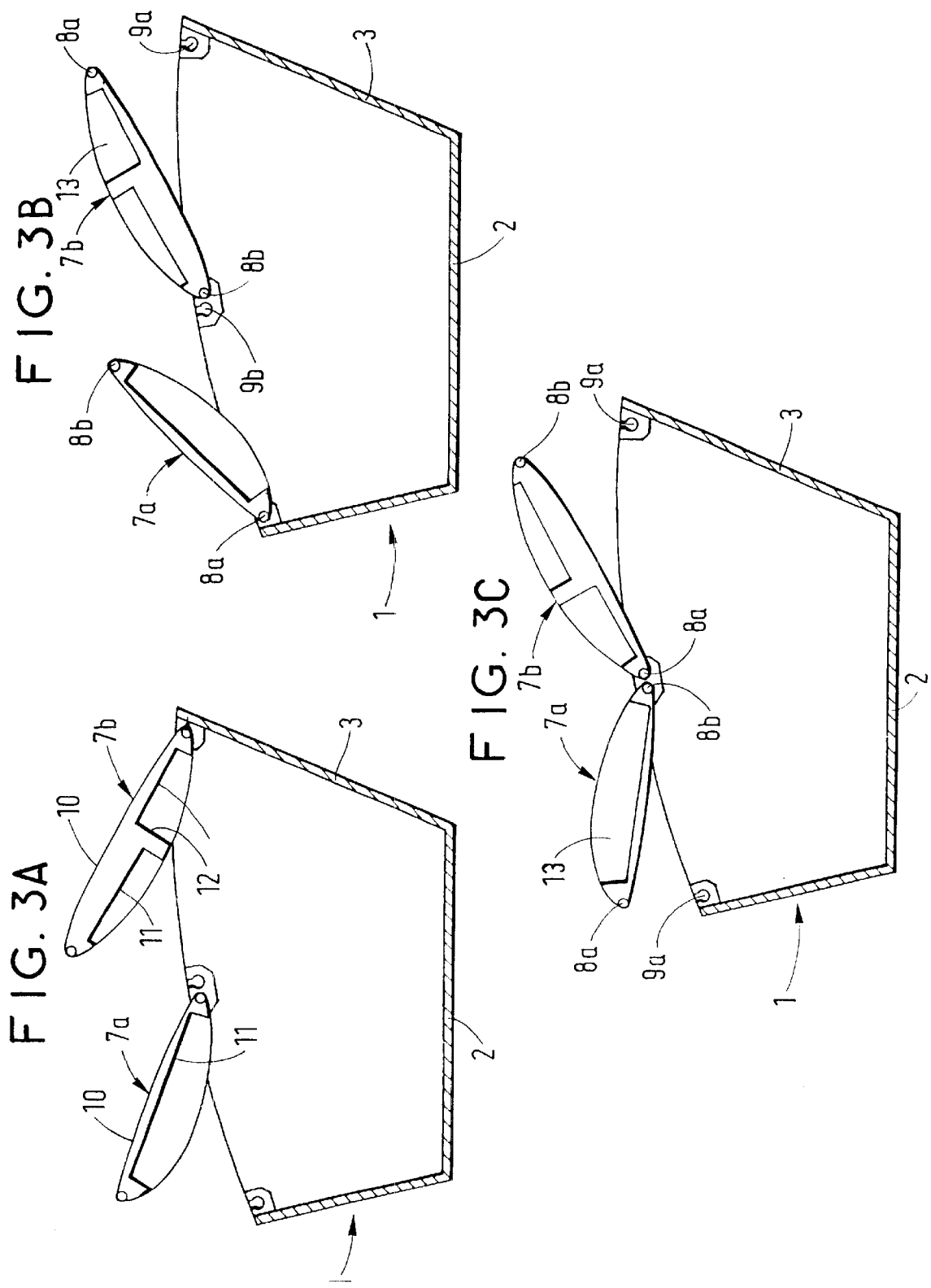

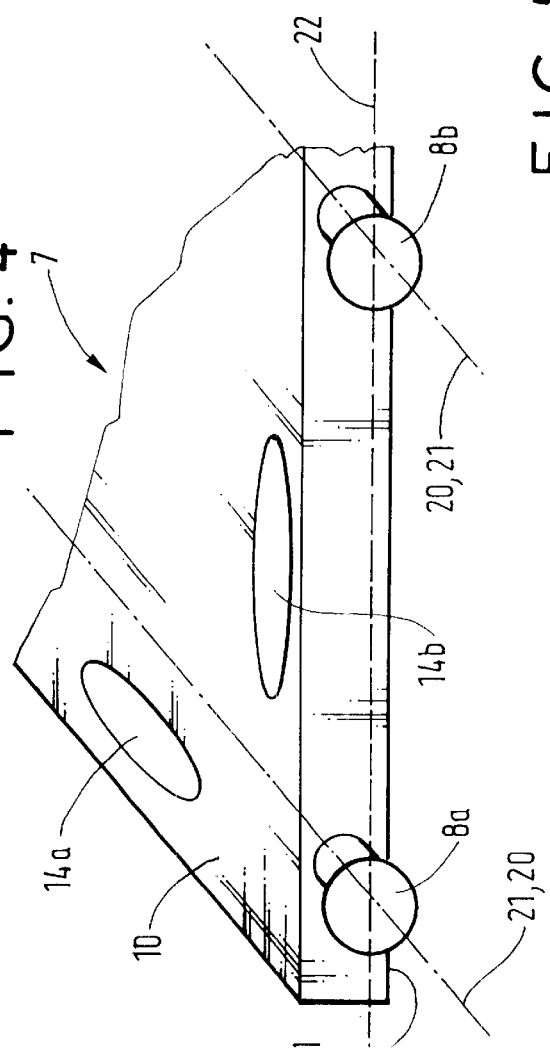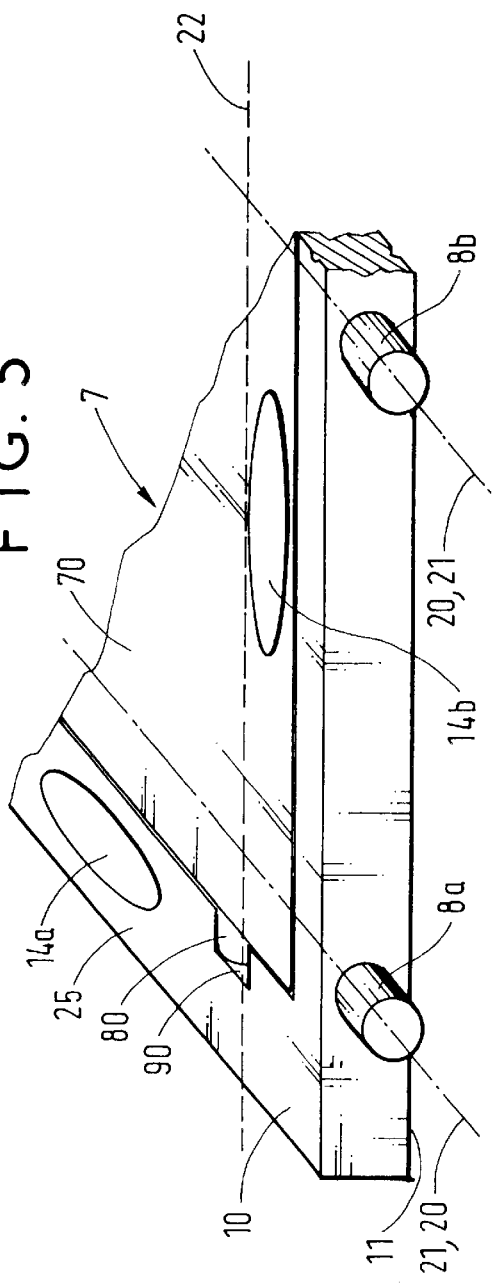

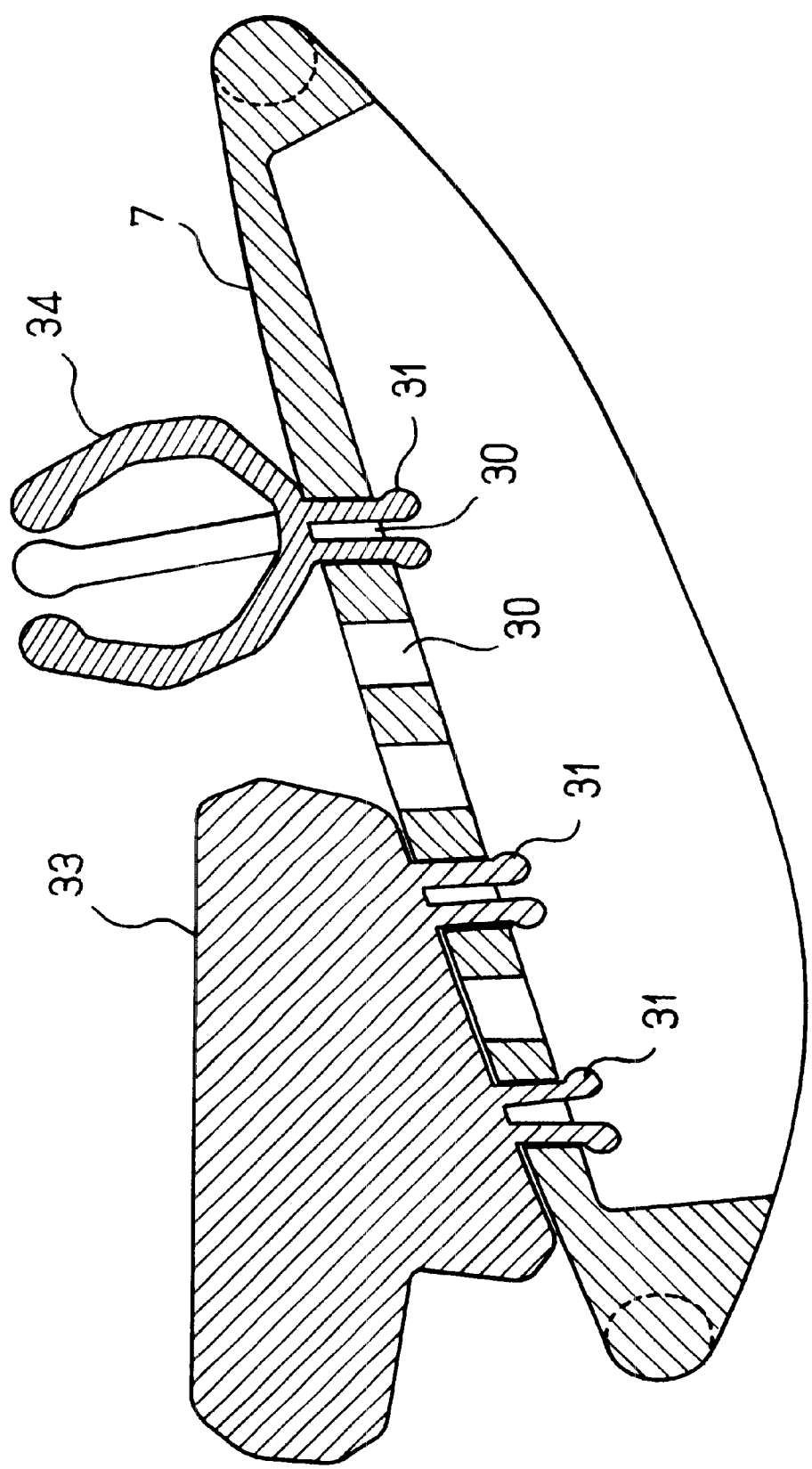
FIG_6

MOTOR VEHICLE CENTRAL CONSOLE

BACKGROUND OF THE INVENTION

The invention relates to a motor vehicle central console. In particular, the invention relates to a central console disposed between the front seats of the motor vehicle and having a movable lid.

The central console of a motor vehicle must fulfill safety criteria, especially with regard to rigid connection to the vehicle in case of abrupt braking or impact. For this reason, the components of the central console, such as, for example, a lid, an arm rest, or a cup holder are permanently attached to the body of the console. These components may of course execute relative movements with respect to the console, but those movements are limited rotational or translational movements without breakage of the permanent rigid connection to the body of the console.

One of the requirements of motor vehicle manufacturers with regard to a motor vehicle central console comprises the incorporation of a maximum of storage functions, optionally with an arm rest function, within a specific space, having optimum ergonomics with respect to all the occupants of the vehicle. The technical solutions fulfilling this requirement are limited by the fact of the permanent rigid connections to the body of the console. These permanent rigid connections limit the possibilities of modularity of the central console.

SUMMARY OF THE INVENTION

One of the aims of the present invention is that of proposing a central console in which the modularity is substantially improved.

Another aim of the present invention is to propose a central console in which the accessibility to the storage functions is substantially improved for the rear occupants without deterioration for the front occupants.

To this end, the invention relates to a motor vehicle central console comprising:
- an enclosure comprising a base, a front face, a rear face and two lateral faces arising from the base, said faces forming an opening opposite to said base, and
- at least one lid comprising a recto face and a verso face, having means for coupling to the enclosure co-operating with complementary coupling means borne by the enclosure, and at least partially closing said opening.

According to the invention:
- the lid is completely removable, said coupling means of the lid being completely and simply disconnectable from said complementary coupling means of the enclosure, and
- in the mounted position, said coupling means of the lid co-operate with said complementary coupling means of the enclosure, regardless of which face of the lid is facing towards the base of the enclosure.

Said coupling means and said complementary coupling means comprise:
- first rotation means and first complementary rotation means defining a first axis of rotation of the lid relative to the enclosure, and
- second rotation means and second complementary rotation means defining a second axis of rotation of the lid relative to the enclosure substantially parallel to the first axis of rotation, said first and second rotation means being completely and simply disconnectable from said first and respectively second complementary rotation means to respectively permit the rotation of the lid about the second axis of rotation, and the rotation of the lid about the first axis of rotation.

The console may advantageously comprise at least third rotation means defining a third axis of rotation of the lid relative to the enclosure, intersecting with the first and second axes of rotation.

In one embodiment, the coupling means and the complementary coupling means comprise four "Ω"-groove and journal systems forming, in pairs, two substantially parallel axes.

In another embodiment, the coupling means and the complementary coupling means comprise four ball-and-socket joint systems forming, in pairs, two series of two substantially parallel axes, the axes of one series being perpendicular to the axes of the other series.

In another embodiment, the lid comprises a peripheral frame including said coupling means, and a secondary lid comprising secondary coupling means co-operating with complementary secondary coupling means borne by said peripheral frame.

According to another feature of the invention, the lid comprises at least one lateral wall arising from one of the faces of the lid forming with said face a receptacle.

According to another feature, the console further comprises added-on functional means having means for connection to complementary connection means borne by the lid.

In one embodiment, the connection means of the added-on functional means are clip-in pins and the complementary connection means borne by the lid are holes into which said clip-in pins are clipped.

A first advantage of the present invention results from the reversibility of the lid of the console, permitting improved modularity. For example, the recto face of the lid may have a surface completing the aesthetics of the console with a surface substantially in the extension of, and following the shape of the opening, and a verso surface comprising functional means for small article storage or a cup holder. In order to be able to use both faces of the lid while maintaining the lid function, the lid is completely removable and comprises means for coupling to the enclosure functioning regardless of which face of the lid it is desired to use.

Another advantage of the present invention results from the improvement of the accessibility of the storage spaces regardless of the occupant. This is due to the coupling means of the lid and the complementary coupling means of the enclosure providing a plurality of axes of rotation for the lid. Optimally, provision may be made to open the lid along four axes, parallel in pairs, together forming a parallelogram substantially defining the four sides of the lid.

Another advantage of the present invention results from the substantially lower cost of the modularity function compared with the high costs of the modularity in the systems of rotation and/or translation with permanent rigid connection that are used. For this reason it is possible to propose modular consoles on "economy" vehicles.

BRIEF DESCRIPTION OF THE DRAWINGS

Further advantages and features of the present invention will become clear from the following description with reference to the appended drawings, in which:

FIGS. 3A to 3C are diagrammatic views illustrating the accessibility of the console according to the invention.

FIG. 4 is a diagrammatic view according to the invention of a portion of a central console lid according to the invention in a "ball-and-socket" embodiment.

FIG. 5 is a diagrammatic view according to the invention of a portion of a central console lid according to the invention in a "frame" embodiment.

FIG. 6 is a diagrammatic view in section of a portion of a central console lid comprising added-on functional means according to the invention.

DETAILED DESCRIPTION OF PREFERRED EMBODIMENTS

Figure 1:
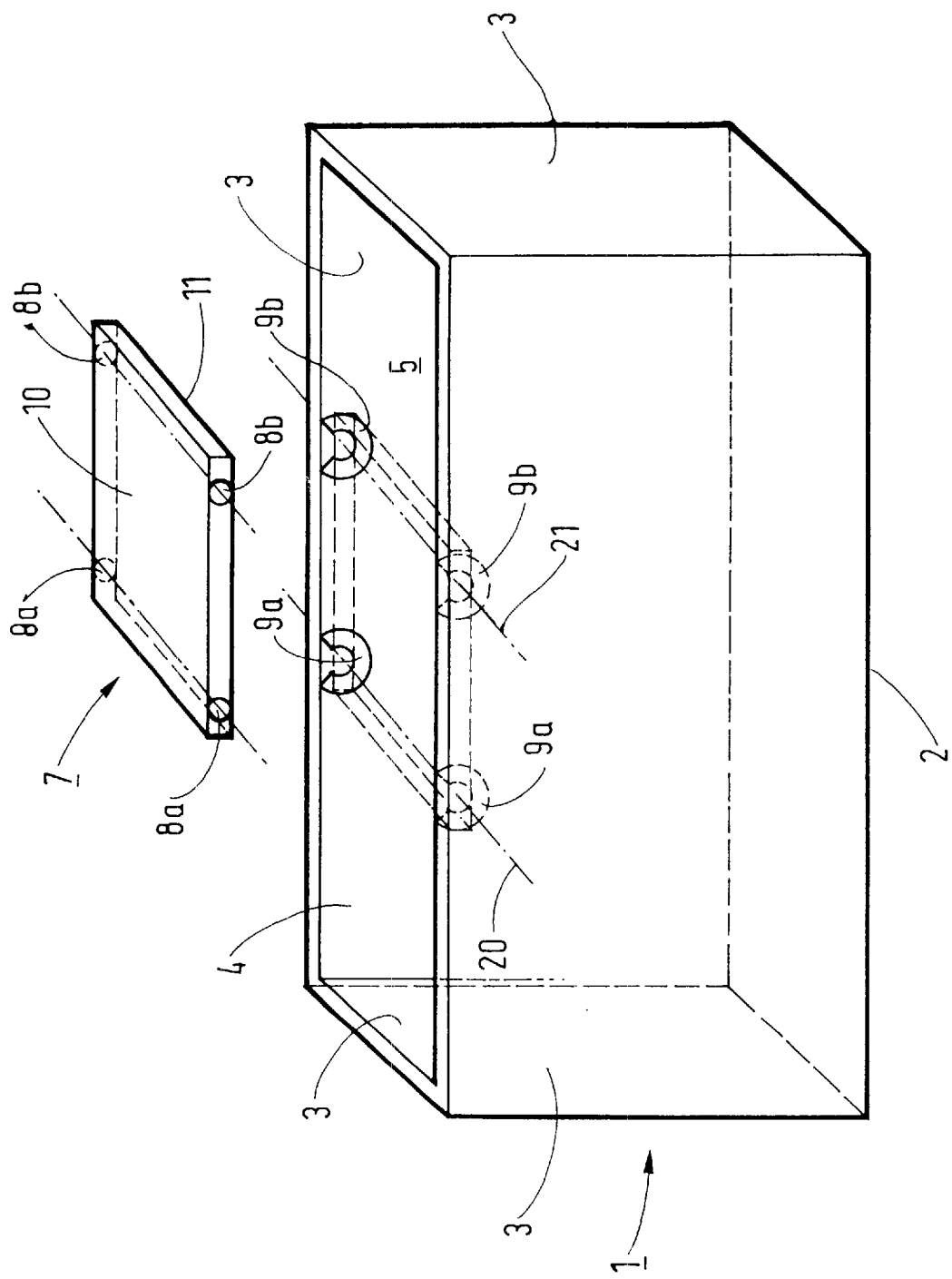
FIG. 1 is a diagrammatic view of a console according to the present invention.

The central console according to the invention comprises an enclosure 1 having a base 2, and four lateral faces 3 arising from the base 2 and forming an opening 4 opposite to the base 2. The enclosure 1 is generally removably or fixedly associated with the floor of the motor vehicle between the front seats (not shown). The enclosure 1 defines a storage space 5. In one embodiment, the space 5 may be divided into a plurality of sub-spaces 50 by walls 6 that are removable or fixed with respect to the enclosure 1 (cf. FIGS. 2A to 2D).

The console according to the invention comprises at least one lid 7 having a recto face 10 and a verso face 11. The lid at least partially closes the opening 4, one of the faces 10, 11 then facing towards the base 2 of the enclosure 1. The lid 7 is associated with the enclosure 1 by coupling means 8a, 8b co-operating with complementary coupling means 9a, 9b borne by the enclosure 1. The coupling means 8a, 8b of the lid 7 and the complementary coupling means 9a, 9b of the enclosure 1 are such that they can be disconnected simply and completely from one another. In other words, the lid 7 is completely removable. By "simply and completely" it is meant that the full removability of the lid 7 constitutes one of the current operational functions of the central console accessible to all the occupants of the vehicle, as opposed to a lid which can be dismantled by the use of tools during exceptional operations of the maintenance or repair type.

The coupling means 8a, 8b of the lid 7 are such that they co-operate with the complementary coupling means 9a, 9b of the enclosure regardless of which face 10, 11 of the lid 7 is facing towards the base 2.

The lid of the console according to the invention, in the position mounted on the enclosure, can pivot equally well about at least two axes of rotation 20, 21, 22, 23; for this purpose, said coupling means 8a, 8b and said complementary coupling means 9a, 9b comprise first rotation means 8a and first complementary rotation means 9a, defining a first axis of rotation 20 of the lid 7 relative to the enclosure 1, and second rotation means 8b and second complementary rotation means 9b, defining a second axis of rotation 21 of the lid 7 relative to the enclosure 1, said second axis of rotation 21 being substantially parallel to the first axis of rotation 20.

According to the invention, said first rotation means 8a are completely and simply disconnectable from said first complementary rotation means 9a to permit the rotation of the lid 7 about the second axis of rotation 21, and said second rotation means 8b are completely and simply disconnectable from said second complementary rotation means 9b to permit the rotation of the lid 7 about the first axis of rotation 20.

According to another feature said first rotation means 8a and said second rotation means 8b are such that they can co-operate equally well with either of said first 9a or second 9b complementary rotation means.

For this reason, the second axis of rotation 21 may also be defined by the co-operation of the first rotation means 8a with the second complementary rotation means 9b, and the first axis of rotation 20 may also be defined by the co-operation of the second rotation means 8b with the first complementary rotation means 9a (cf. lid 7b in FIGS. 2C and 2D, or 3B and 3C).

FIGS. 1 to 3C represent a console according to the invention in which the coupling means 8a, 8b and the complementary coupling means 9a, 9b comprise four "Ω"-groove 9a and journal 9b systems forming, in pairs, the two substantially parallel axes 20, 21. In the drawings, the "Ω"-grooves are borne by the enclosure 1 and the journals are borne by the lid 7. The reverse assembly, of course, also forms part of the present invention.

The console with double axes of rotation, if the axes 20, 21 are perpendicular to the direction of advance of the motor vehicle, allows easy accessibility to the contents of the space 5, 50 of the console by the front passengers by rotation of the lid about one of the axes of rotation, and easy accessibility to the contents of the space 5, 50 of the console by the rear passengers by rotation of the lid about the other of the axes of rotation. FIGS. 3A to 3C propose some possibilities for opening a console according to the invention comprising two lids 7a, 7b.

In the embodiment shown partially in FIG. 4, the coupling means and the complementary coupling means comprise four ball-and-socket joint systems forming, in pairs, two series of two substantially parallel axes, the axes 20, 21 of one series being perpendicular to the axes 22 of the other series.

In another embodiment shown partially in FIG. 5, the lid comprises a peripheral frame 25, and a secondary lid 70 comprising secondary coupling means 80 co-operating with complementary secondary coupling means 90 borne by said peripheral frame 25.

Opening handles 14a, 14b are provided so as to facilitate the opening of the lid 7.

Figure 2A:
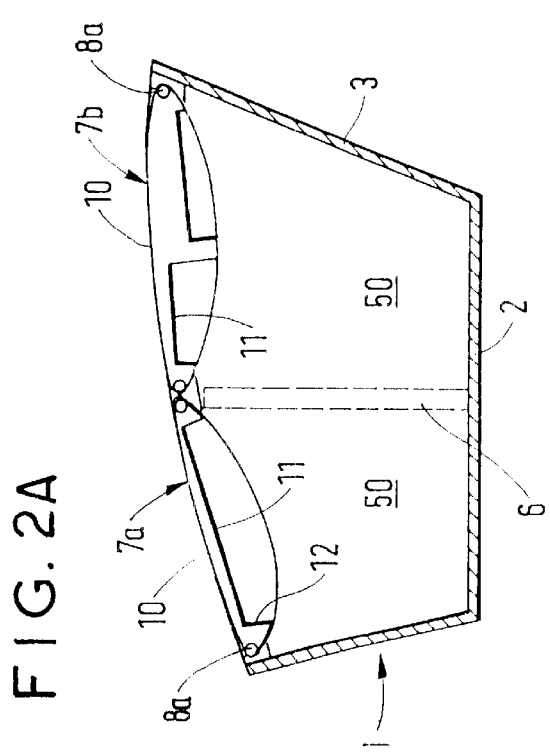
FIGS. 2A to 2D are diagrammatic views illustrating the modulability of the lid of the console according to the invention.
Figure 2B:
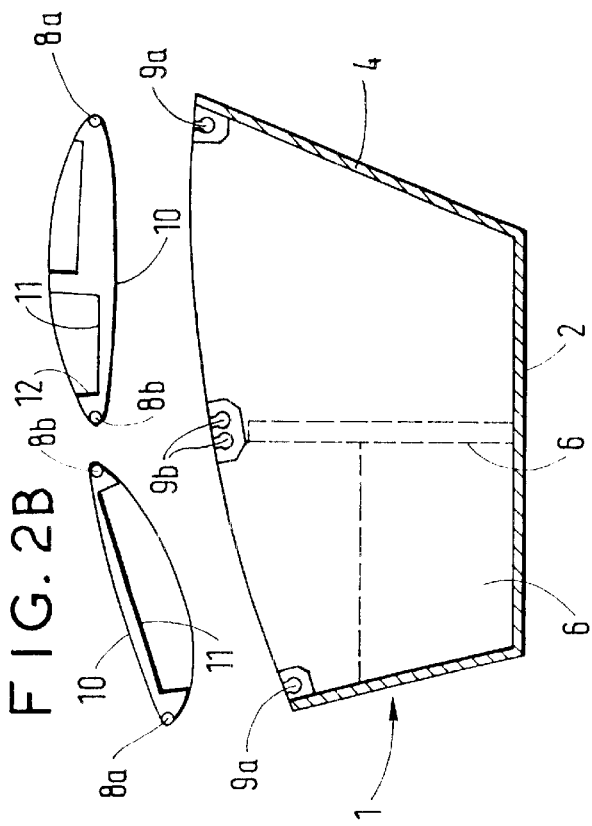
Figure 2C:
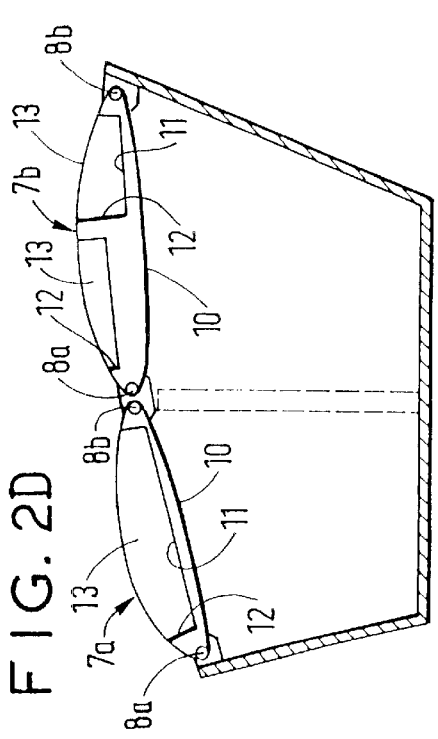
Figure 2D:
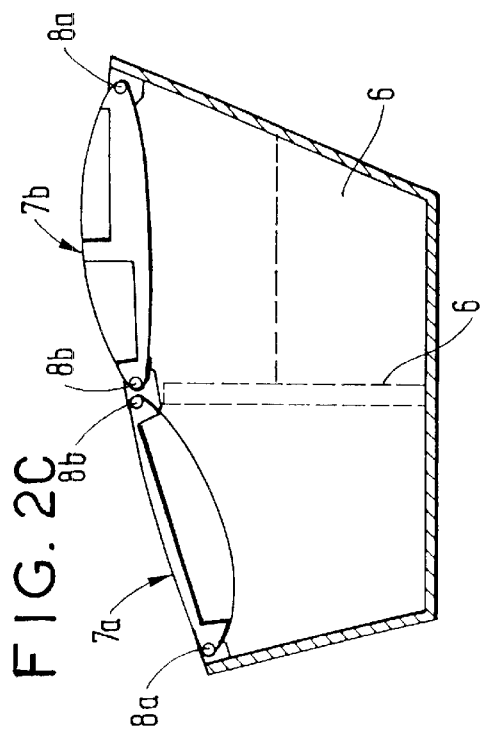

One of the advantages of a console according to the invention is to allow the user to use either of the faces 10, 11 of the lid 7. In an embodiment shown in FIGS. 2A to 3D, one of the faces 10, 11 of the lid 7a, 7b comprises at least one lateral wall 12 arising from one 11 of the faces 10, 11 of the lid 7 and forms with said face 11 a receptacle 13. In the position in FIG. 2A, the lids 7a, 7b have their recto face 10 completing the aesthetics of the console with a surface substantially in the extension of, and following the shape of the opening 4 of the console. In FIGS. 2C and 2D, at least one of the lids 7a, 7b has been turned to the verso side, and provides at least one storage receptacle 13.

In one embodiment the console further comprises added-on functional means 33, 34 having means for connection 31 to complementary connection means 30 borne by the lid 7. These functional means 33, 34 are, by way of non-limiting example, an arm rest or arm rests 33, or holding members 34 for articles such as a mobile telephone, etc.

In the exemplary embodiment shown in FIG. 6, the connection means 31 of the added-on functional means 33, 34 are clip-in pins 31 and the complementary connection means 30 borne by the lid 7 are through holes 30 into which said clip-in pins 31 are clipped.

What is claimed is:

1. A motor vehicle central console comprising:
   an enclosure comprising a base, and four lateral faces arising from the base, said faces forming an opening opposite to said base,
   at least one lid comprising a recto face and a verso face, having means for coupling to the enclosure co-operating with complementary coupling means borne by the enclosure, and at least partially closing said opening,
   the lid being completely removable, said coupling means of the lid being completely and simply disconnectable from said complementary coupling means of the enclosure, and
   in the mounted position, said coupling means of the lid co-operate with said complementary coupling means of the enclosure, regardless of which face of the lid is facing towards the base of the enclosure,
   wherein
      said coupling means and said complementary coupling means comprise:
         first rotation means and first complementary rotation means defining a first axis of rotation of the lid relative to the enclosure, and
         second rotation means and second complementary rotation means defining a second axis of rotation of the lid relative to the enclosure substantially parallel to the first axis of rotation,
         said first and second rotation means being completely and simply disconnectable from said first and respectively second complementary rotation means to permit, respectively, the rotation of the lid about the second axis of rotation, and the rotation of the lid about the first axis of rotation.

2. The central console according to claim 1, wherein said first rotation means and said second rotation means co-operate equally well with either of said first or second complementary rotation means.

3. The central console according to claim 1, which comprises at least third rotation means defining a third axis of rotation of the lid relative to the enclosure, intersecting with the first and second axes of rotation.

4. The central console according to claim 1, wherein the coupling means and the complementary coupling means comprise four "Ω"-groove and journal systems forming, in pairs, two substantially parallel axes.

5. The central console according to claim 1, wherein the coupling means and the complementary coupling means comprise four ball-and-socket joint systems forming, in pairs, two series of two substantially parallel axes, the axes of one series being perpendicular to the axes of the other series.

6. The central console according to claim 1, wherein the lid comprises a peripheral frame including said coupling means, and a secondary lid comprising secondary coupling means co-operating with complementary secondary coupling means borne by said peripheral frame.

7. The central console according to claim 1, wherein the lid comprises at least one lateral wall arising from one of the faces of the lid forming with said face a receptacle.

8. The central console according to claim 1, which further comprises added-on functional means having connection means co-operating with complementary connection means borne by the lid.

9. The central console according to claim 8, wherein the connection means of the added-on functional means are clip-in pins and the complementary connection means borne by the lid are holes into which said clip-in pins are clipped.

* * * * *